Aug. 5, 1958  H. E. W. WERNER  2,845,735
FLOWER-POT COVER
Filed Dec. 22, 1954
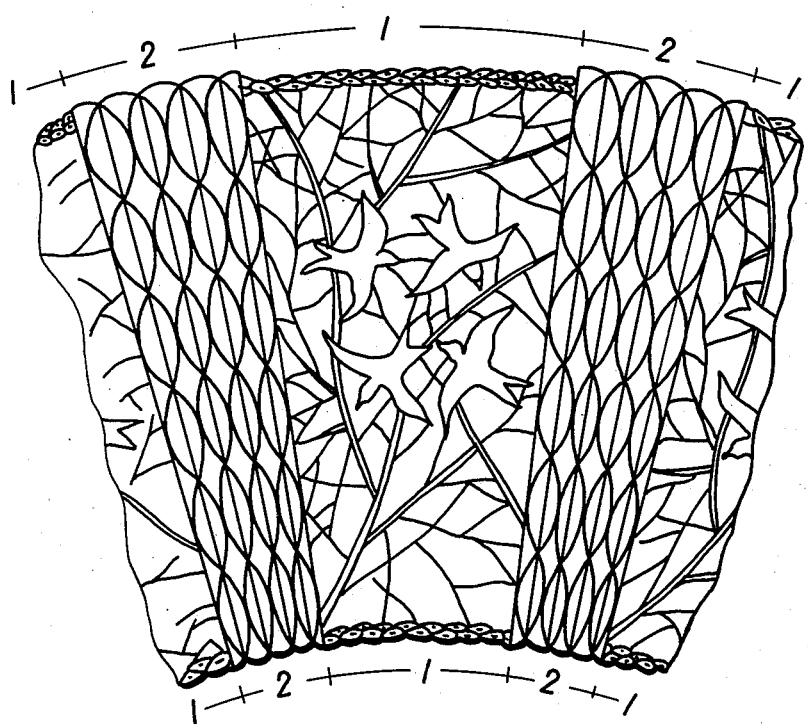

United States Patent Office 2,845,735
Patented Aug. 5, 1958

2,845,735

FLOWER-POT COVER

Hermann Emil Wilhelm Werner, Oslo, Norway, assignor to Norsk Thermoform Industri, Kongsberg, Norway, a Norwegian firm Application December 22, 1954, Serial No. 476,945

Claims priority, application Norway February 11, 1954

1 Claim. (Cl. 41—10)

This invention relates to decorative covers.

Flower-pots, and especially those of burnt clay, have an unpleasing appearance and it is usual to decorate such pots with, for example, crepe paper or by placing the flower-pots in another and larger glazed pot.

Crepe paper will after a comparatively short time become moist and, in addition to the fact that the discolored paper will then be unsightly, the paper will become mouldy and have a disagreeable smell.

The use of glazed pots is disadvantageous since they require a large space. Furthermore, they prevent seeing whether there is an excess of water so that a control of the watering of a plant is impossible. Further, the soil in a flower-pot should be able to breathe through the walls of the pot and this is, to a considerable extent, prevented when a glazed air-tight pot is placed around a flower-pot.

It has also been proposed to decorate flower-pots with small baskets of wooden materials and the like, but these will darken when exposed to moisture and will bend and crack.

There exists also a demand for protective and decorative devices which, in addition to their resistance to moisture and their ability to let the soil in the pot breathe, may be expanded so that the same device may be employed on a number of flower-pots of different sizes.

An object of the present invention is to obviate the disadvantages mentioned above by providing a protective and decorative device with the required properties.

This is effected in accordance with the invention by providing a device with a number of non-extensible sections which are connected to each other by means of extensible sections so that a cover is formed having a shape adapted to correspond with that of a flower-pot.

To give the device a pleasing appearance, the non-extensible sections are provided with suitable designs or decorations and these sections are non-extensible to prevent distortion of said designs by the extension of the cover when it is placed on a flower-pot, as only the extensible sections will be stretched.

Said designs and decorations are preferably made as cut-outs so that air has access to the outer side of the flower-pot, but the decorations may also be shaped as closed designs as the extensible sections will be so open that the air obtains sufficient access through said latter sections alone.

The protective and decorative device is preferably manufactured from a segment-shaped blank, whose radii of curvature correspond to the top and bottom diameters desired on the completed device.

The arc or segment-shaped blank is then formed as a truncated conical cover and the blank is formed into a closed loop or ring by securing adjoining edges to each other in a manner known per se.

The invention thus consists of a protective and decorative device for flower-pots and similar devices in the shape of a cover which is pulled over the outside of a pot and the invention is characterized in that the cover, which preferably is made of plastic, comprises non-extensible sections with intermediate extensible sections, the non-extensible sections being provided with suitable decorative designs which thus will not be distorted when the cover is extended.

To enable as much air as possible to reach the outer side of the pot, the material of the cover is, in accordance with the invention, provided with cut-out designs.

The device may suitably be manufactured by a method in which the blank for the cover is molded, stamped, pressed or shaped in any other manner from flat or planar segment-shaped blanks, which thereafter are bent into closed loops and are joined along the adjoining edges.

To enable the invention to be clearly understood, a part of a blank for a cover is shown in flat condition in the accompanying drawing.

The blank for the cover which preferably is manufactured from plastic such as polyethylene, comprises alternately non-extensible sections 1 and extensible sections 2, of which at least the extensible section 2 is provided with cut-outs. This provides for expansion of the blank in its own plane, i. e., the plane of the drawing.

The non-extensible sections 1 may, of course, be flexed so that they may be adjusted to the curvature of a flower-pot, but they are not extensible laterally (i. e., in the plane of the drawing) and the design of the sections 1 will therefore not be distorted even if the decorative device has its periphery expanded by being forced onto a flower-pot which is considerably larger than the one for which the device is most suited.

The extensible sections 2 may also be constructed in many different ways, which all will fall within the scope of the invention, and as an example the plastic material which forms said sections may be cut in the same manner as the so-called "expansible metal."

What is claimed is:

A substantially planar blank for a protective decorative cover for a flower-pot comprising flexible sections of constant width and intermediate extensible sections coupling said flexible sections so that said blank is expandible in its own plane, said flexible sections being provided with decorative designs, the constant width of the flexible sections preventing the distortion of said designs, said flexible and intermediate sections being of a single piece substantially having the shape of an arc whereby said blank is adapted to assume the shape of a truncated cone.

References Cited in the file of this patent

UNITED STATES PATENTS

| | | |
|---|---|---|
| 790,924 | Samuels | May 30, 1905 |
| 1,446,563 | Hughes | Feb. 27, 1923 |
| 1,520,647 | Hennegan | Dec. 23, 1938 |
| 2,110,981 | Auslander | Mar. 15, 1938 |
| 2,115,022 | Kastner | Apr. 26, 1938 |
| 2,346,824 | Cohen | Apr. 18, 1944 |
| 2,450,759 | Leech | Oct. 5, 1948 |